(12) United States Patent
Li et al.

(10) Patent No.: US 10,988,337 B2
(45) Date of Patent: Apr. 27, 2021

(54) BONDING MACHINE CAPABLE OF TRIMMING NEW AND OLD SMT SPLICE TAPES

(71) Applicant: DONGGUAN UNIVERSITY OF TECHNOLOGY, Dongguan (CN)

(72) Inventors: Chuan Li, Dongguan (CN); Jun Deng, Dongguan (CN); Hongjiao Xu, Dongguan (CN); Chuliang He, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 116 days.

(21) Appl. No.: 16/329,016

(22) PCT Filed: Dec. 23, 2017

(86) PCT No.: PCT/CN2017/118141
§ 371 (c)(1),
(2) Date: Feb. 27, 2019

(87) PCT Pub. No.: WO2018/126915
PCT Pub. Date: Jul. 12, 2018

(65) Prior Publication Data
US 2020/0079610 A1 Mar. 12, 2020

(30) Foreign Application Priority Data

Jan. 3, 2017 (CN) .......................... 201710002594.3

(51) Int. Cl.
*B65H 19/18* (2006.01)
*B65H 21/00* (2006.01)
(Continued)

(52) U.S. Cl.
CPC ........... *B65H 19/181* (2013.01); *B65H 21/00* (2013.01); *B65H 35/06* (2013.01);
(Continued)

(58) Field of Classification Search
CPC ................ B65H 2301/4622; B65H 2301/4631
See application file for complete search history.

(56) References Cited

U.S. PATENT DOCUMENTS 3,434,400 A * 3/1969 Hochfeld ................. B31D 5/04
493/417
4,082,592 A * 4/1978 Raabe ................ B29O 65/5057
156/153

(Continued)

FOREIGN PATENT DOCUMENTS

| CN | 105751554 | 7/1916 |
| CN | 106865300 | 6/1917 |

(Continued)

*Primary Examiner* — Mark A Osele
(74) *Attorney, Agent, or Firm* — Law Offices of Steven W. Weinrieb (57) ABSTRACT

A bonding machine capable of trimming new and old SMT splice tapes comprises a supporting plate (1). A new splice tape conveying device (3) and an old splice tape conveying deVice (4) are disposed upon the supporting plate (1) are disposed opposite each other. A lifting device (8) is disposed in the middle of the supporting plate (1), and a bonding mechanism (7) is disposed above the lifting device (8). A cutting device (6) is disposed above the old splice tape conveying device (4) and comprises a cutting seat (60), a cutting motor (61) disposed upon the cutting seat (60), and a cutting cam (62) connected to a cutter (64) which is disposed upon the cutting seat (60).

8 Claims, 7 Drawing Sheets (51) Int. Cl.
*B65H 35/07* (2006.01)
*B65H 35/06* (2006.01)

(52) U.S. Cl.
CPC ............. *B65H 2301/4631* (2013.01); *B65H 2601/511* (2013.01); *B65H 2701/1722* (2013.01)

(56) References Cited

U.S. PATENT DOCUMENTS

| | | | | |
|---|---|---|---|---|
| 4,765,862 | A | * | 8/1988 | Azuma ................. B29O 65/00 156/304.1 |
| 4,867,835 | A | * | 9/1989 | Poole .................... B29O 65/20 156/507 |
| 5,795,431 | A | * | 8/1998 | Weissfloch ......... B29O 65/7894 156/304.6 |
| 7,328,734 | B2 | * | 2/2008 | Bacik .................... B29O 37/04 156/304.2 |
| 8,052,832 | B2 | * | 11/2011 | Tiefel ................ B65H 19/1852 156/304.3 |
| 9,188,192 | B2 | * | 11/2015 | Cancienne, Jr. ............................. B29O 66/02241 |
| 9,302,439 | B2 | * | 4/2016 | Pan ................... B29O 66/5241 |
| 9,796,135 | B2 | * | 10/2017 | Guttenberg ........ B29O 65/7841 |
| 9,827,706 | B2 | * | 11/2017 | Callaway, III ........ B23K 20/22 |
| 2011/0067801 | A1 | * | 3/2011 | van 't Schip ...... B29O 66/1142 156/157 |

FOREIGN PATENT DOCUMENTS

| | | | |
|---|---|---|---|
| CN | 101804922 | | 8/2010 |
| CN | 203359622 | | 12/2013 |
| CN | 204917355 | | 12/2015 |
| JP | 2012116601 | A * | 6/2012 |
| JP | 2014133616 | A * | 7/2014 |

\* cited by examiner

BONDING MACHINE CAPABLE OF TRIMMING NEW AND OLD SMT SPLICE TAPES

FIELD OF THE INVENTION

The present invention relates generally to processing equipment of SMT splice tapes, and more especially to a bonding machine for new and old SMT splice tapes.

BACKGROUND OF THE INVENTION

With the development of electronic device, splice tapes are more wildly used in a great demand. The splice tapes could splice material without stopping the machine during the processes of electronic devices. Compared with the prior art which may need to stop the machine, the present invention could save the time, increase the efficiency and reduce the cost of splicing material.

Splice tapes would be partly damaged as time goes on while the whole tapes need to be replaced, which may cause the increasement of the cost. Therefore, how to recycle the partly damaged tapes to save the cost become the new breakthrough of the research.

SUMMARY OF THE INVENTION

The present invention relates to bonding machine for new and old SMT splice tapes, which could cut off the old and damaged splice tapes by cut-off device with transfer the new and old splice tapes to the center part by new splice tapes conveying device and old splice tapes conveying device. With the bonding device bonding and splicing the splice tapes, the old splice tapes could be reused, which ensures the quality of splice tapes and reduces the cost to a certain extent.

To achieve the above goals, the technical scheme adopted by the invention is shown as follows: A bonding machine for new and old SMT splice which comprises a supporting plate 1; a new splice tapes conveying device 3 and an old splice tapes conveying device 4 facing each other are provided on the supporting plate 1; limit blocks 9 fitting splice tapes are provided on both sides of the two conveying devices; A push-up device 8 fitting the splice tapes is provided in the center part of the supporting plate 1; a bonding unit 7 fitting the splice tapes is provided above the push-up device 8. Above the old splice tapes conveying device 4, a cut-off device 6 which may include a cut-off seat 60 provided on supporting plate 1 is installed. On the cut-off seat 60, a cut-off motor 61 which is connected to cut-off cam 62 is provided; the cut-off cam 62 which is connected to a cut-off blade 64 goes through a cut-off link 63. The above new splice tapes conveying device 3, the old splice tapes conveying device 4, the push-up device 8, the bonding unit 7 and the cut-off motor 61 are connected to the controller.

Furthermore, the new splice tapes conveying device 3 and the old splice tapes conveying device 4 share the same front conveying rack 2 which is connected to two adjusting conveying boards 14 which are centrosymmetric running back and forth. And the two adjusting conveying boards 14 is provided on a conveying movable block 13 which fits an adjusting conveying slide rail 15 running back and forth on the supporting plate 1. The conveying movable block 13 is fixed on and engages with an adjusting conveying belt 12 which fits an adjusting conveying motor 11 on the supporting plate 1. The adjusting conveying motor 11 is connected to the controller.

Furthermore, the push-up device may include lifting elevators 10 which are provided in front and at back of the supporting plate 1. The front lifting elevators 10 is connected to a push-up movable slide rails housing 19 and the back lifting elevators 10 fits a push-up lifting seat 17 through the slide rails, and a push-up movable cylinder 16 which is connected to a push-up block 18 is provided on the push-up lifting seat 17. The front end of push-up block 18 fits the push-up movable slide rails housing 19. The back lifting elevators 10 and the push-up movable cylinder 16 are connected to the controller.

Furthermore, the bonding unit 7 may include a bonding seat 21 provided on the supporting plate 1. And on the bonding seat 21, a bonding screw seat 23 is provided. Provided on the bonding screw seat 23, a front and rear bonding screw 24 is connected to a front and rear bonding movable motor 22 which is provided on the bonding seat 21 through a synchronous belt and a synchronous wheel. The front and rear bonding screw 24 is plugged into and engages with a front and rear bonding movable seat 25 where an adhesive tapes seat 26 is provided. On the adhesive tapes seat 26, a tapes roll 28 is provided and below the adhesive tapes seat 26, an adhesive device 27 fitting splice tapes is provided. The front and rear bonding movable motor 22 and the adhesive device 27 are connected to the controller.

Furthermore, the adhesive device 27 may include an adhesive feeding device 35 which is provided below the adhesive tapes seat 26 and may include an adhesive pressing device 34 fitting the adhesive feeding device 35 and provided below it. The adhesive feeding device 35 may include an adhesive feeding seat 36 in which an adhesive feeding motor 37 and a guide cylinder 38 are installed. The guide cylinder 38 fits the tapes roll 28 and below it, the first guide cylinder 39 which fits the guide cylinder 38 and a compressing cylinder 41 which fits the first guide cylinder 39 are installed. The first guide cylinder 39 is connected to the adhesive feeding motor 37 through the synchronous belt and synchronous wheel. And the adhesive pressing device 34 and the adhesive feeding motor 37 are connected to the controller.

Furthermore, below the first guide cylinder 39, the second cylinder 40 which fits the compressing cylinder 41 is installed. The first the first guide cylinder and the second guide cylinder 40 are connected to the adhesive feeding motor 37 through the same synchronous wheel. On the side of the adhesive feeding seat 36, a tension wheel 42 fitting the synchronous belt is provided. The first guide cylinder 39 and the second guide cylinder 40 are formed by combining round blocks according to a certain distance, and the gaps are complementary.

Furthermore, a compressing cylinder 41 is provided on the compressing seat 43 which is below the adhesive feeding seat 36. And on the compressing seat 43, an adjusting slot 44 is provided and fits the compressing seat 43, The end of the compressing cylinder 41 is connected to an adjusting bolt 47 through a stretched spring 46. The adjusting bolt 47 fits the adjusting holes 45 on the compressing seat 43 and not less than two adjusting holes 45 installed on the compressing seat 43.

Furthermore, the adhesive pressing device 34 may include an adhesive pressing seat 49 provided below the adhesive feeding seat 36. At the back side of the adhesive pressing seat 49, an adhesive guiding block 50 fitting the tapes is provided. From the back to front, a compressing glue cylinder 52 and a glue cutting opening 51 are arranged in order. On the adhesive pressing seat 49, transport axis 53 fitting the adhesive pressing motor is provided and the transport axis 53 is connected to camshaft 54 through the synchronous belt and synchronous wheel. On the camshaft 54, a glue cut-off cam 55 is provided, which is connected to a glue cut-off blade 56 fitting the glue cutting opening 51. The adhesive pressing motor is connected to the controller.

Furthermore, the adhesive pressing seat 49 is provided on the adhesive lifting seat 32 and the adhesive lifting seat 32 is located at the back of the adhesive pressing seat 49 where a radiator 48 is provided. The adhesive lifting seat 32 is fixed on and fits an adhesive lifting block 31 which is inserted on an adhesive lifting screw which is on an adhesive feeding seat 36. The adhesive lifting screw 30 is connected to an adhesive lifting engine 29 on the adhesive feeding seat 36 through the synchronous belt and synchronous wheel. The adhesive lifting seat 32 fits the adhesive lifting slider 33 provided on the adhesive feeding seat 36. The radiator 48 and the adhesive lifting engine 29 are connected to the controller.

The beneficial effects of the present invention are shown as follows:

The present machine may transport the new and the old splice tapes to the center part by the new splice tapes conveying device and the old splice tapes conveying device. The damaged part of the old splice tapes may be cut off by cut-off device and the new and the old splice tapes may be bonded and spliced at the same time to recycle the old and the new splice tapes, which may not influence the effectiveness of bonding and splicing and reduce the cost to some degrees.

The front-rear position of the front conveying rack could be adjusted by the adjusting conveying board, furthermore, the width of new and old splice tapes conveying device could also be adjusted to make the machine suitable for plural kinds of splice tapes.

With easy structure and operation of the push-up device, it could ensure the bonding and splicing process with the function of push-up device to push up the bonding and splicing part.

The front-rear position of the adhesive device may be adjusted by bonding unit using front and rear bonding screw. Furthermore, two splice tapes could be processed at the same time with easy and convenient operation and accurate front-rear movement of the adhesive device.

With simple structure and easy operation of the adhesive feeding device, the tapes could be easily pulled out from the tapes cylinder.

With the design of the second cylinder and complementary design of the first cylinder, the same compressing cylinder could be used to pull the tapes the second time with a great enhancement of glue feeding. And with the design of tension wheel, the synchronous belts of the first guide cylinder and the second guide cylinder may always remain in a tense state.

The position of compressing cylinder could be adjusted in the adjusting slot. With the adjusting bolt fitting the different adjusting holes, positioning function of the compressing cylinder could be achieved after the adjustment. Furthermore, compressing cylinder needle could adjust the different kinds of tapes for better glue feeding process.

With simple structure of adhesive pressing device, the adhesive guiding block may make the tapes fall vertically, which may contribute to the glue-pressing process of compressing glue cylinder. And with the up and down movement of glue cut-off blade by cam, the operation of cutting-off process could be further simplified.

The adhesive pressing device is provided on the adhesive lifting seat, furthermore, the lifting process of adhesive pressing device could be achieved by the adhesive lifting screw, which may contribute to the accuracy of glue-pressing process.

DETAILED DESCRIPTION OF THE ILLUSTRATED EMBODIMENT

All of the various components in the figures are shown as follows:
1. supporting plate
2. front conveying rack
3. new splice tapes conveying device
4. old splice tapes conveying device
5. adjusting conveying device
6. cut-off device
7. bonding unit
8. push-up device
9. limit blocks
10. lifting elevator
11. adjusting conveying motor
12. adjusting conveying belt
13. conveying movable block
14. adjusting conveying board
15. adjusting conveying slide rail
16. push-up movable cylinder
17. push-up lifting sea
18. push-up block
19. push-up movable slide rails housing
20. front and rear bonding movable slide rail
21. bonding seat
22. front and rear bonding movable motor
23. bonding screw seat
24. front and rear bonding screw
25. front and rear bonding movable seat
26. adhesive tapes seat
27. adhesive device
28. tapes roll
29. adhesive lifting engine
30. adhesive lifting screw
31. adhesive lifting block
32. adhesive lifting seat
33. adhesive lifting slider
34. adhesive pressing device
35. adhesive feeding device
36. adhesive feeding seat
37. adhesive feeding motor
38. guide cylinder
39. the first guide cylinder
40. the second cylinder
41. compressing cylinder
42. tension wheel 43. compressing seat
44. adjusting slot
45. adjusting hole
46. stretched spring
47. adjusting bolt
48. radiator
49. adhesive pressing seat
50. adhesive guiding block
51. glue cutting opening
52. compressing glue cylinder
53. transport axis
54. camshaft
55. glue cut-off cam
56. glue cut-off blade
60. cut-off seat
61. cut-off motor
62. cut-off cam
63. cut-off link
64. cut-off blade
65. cut-off slide rail In order to enable a person skilled in the art to better understand the technical scheme of the present invention, the following description may be given to the present invention in detail with reference to the accompanying drawings. The description of the invention is merely exemplary and explanatory and should not limit the scope of the protection scope of the present invention.

As it shown in FIGS. 1-9, the specific structure of the present invention is shown as follows: a bonding machine for new and old SMT splice which comprises a supporting plate 1; a new splice tapes conveying device 3 and an old splice tapes conveying device 4 facing each other are provided on the supporting plate 1; limit blocks 9 fitting splice tapes are provided on both sides of the two conveying devices; A push-up device 8 fitting the splice tapes is provided in the center part of the supporting plate 1; a bonding unit 7 fitting the splice tapes is provided above the push-up device 8. Above the old splice tapes conveying device 4, a cut-off device 6 which may include a cut-off seat 60 provided on supporting plate 1 is installed. On the cut-off seat 60, a cut-off motor 61 which is connected to cut-off cam 62 is provided; the cut-off cam 62 which is connected to a cut-off blade 64 goes through a cut-off link 63. The above new splice tapes conveying device 3, the old splice tapes conveying device 4, the push-up device 8, the bonding unit 7 and the cut-off motor 61 are connected to the controller.

Figure 1:
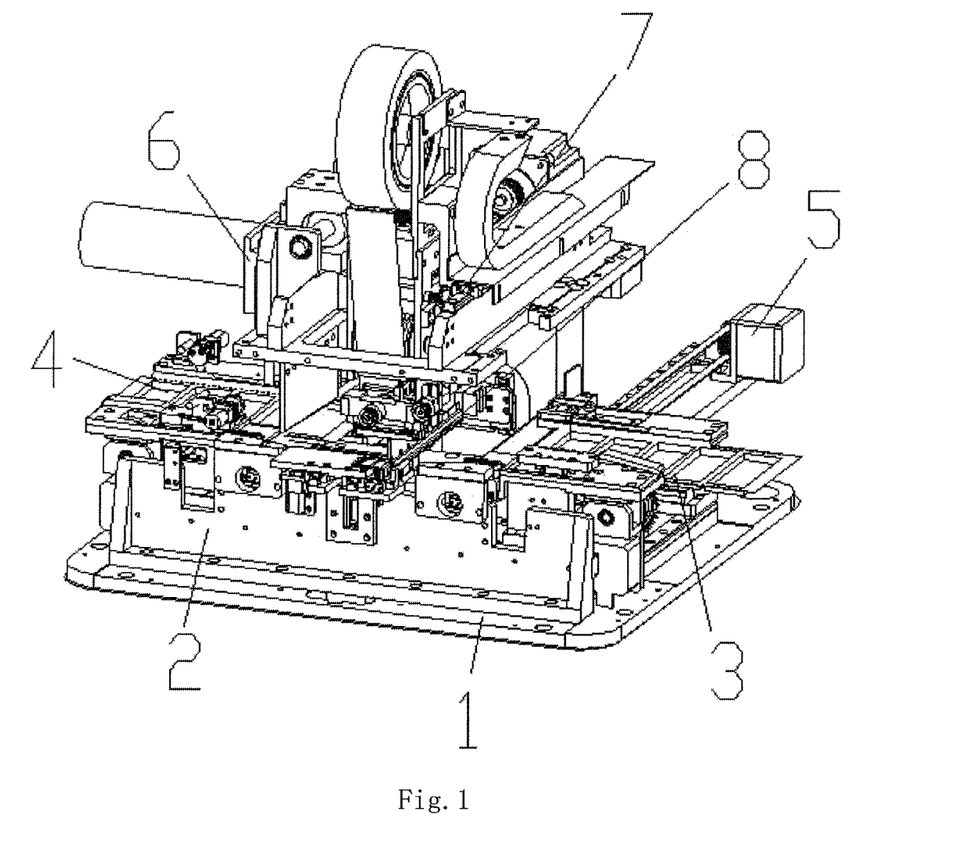
FIG. 1 shows a stereoscopic view of the bonding machine for new and old SMT splice tapes.
Figure 2:
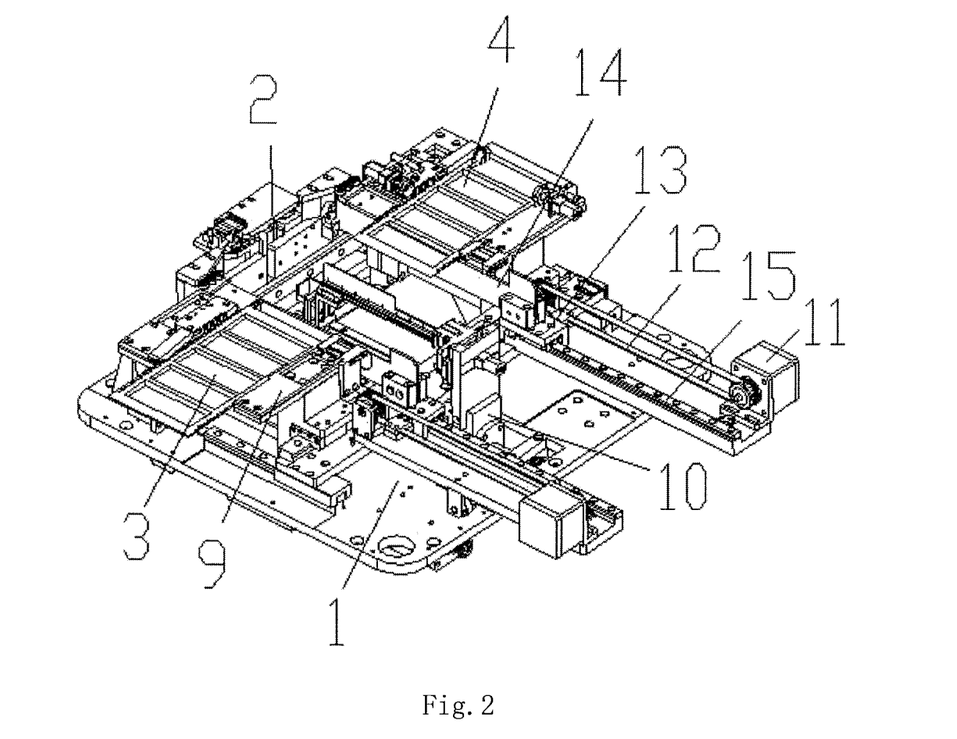
FIG. 2 shows a stereoscopic view of the conveying part of the old and new splice tapes.

Preferably, the new splice tapes conveying device 3 and the old splice tapes conveying device 4 share the same front conveying rack 2 which is connected to two adjusting conveying boards 14 which are centrosymmetric running back and forth. And the two adjusting conveying boards 14 is provided on a conveying movable block 13 which fits an adjusting conveying slide rail 15 running back and forth on the supporting plate 1. The conveying movable block 13 is fixed on and engages with an adjusting conveying belt 12 which fits an adjusting conveying motor 11 on the supporting plate 1. The adjusting conveying motor 11 is connected to the controller.

Figure 3:
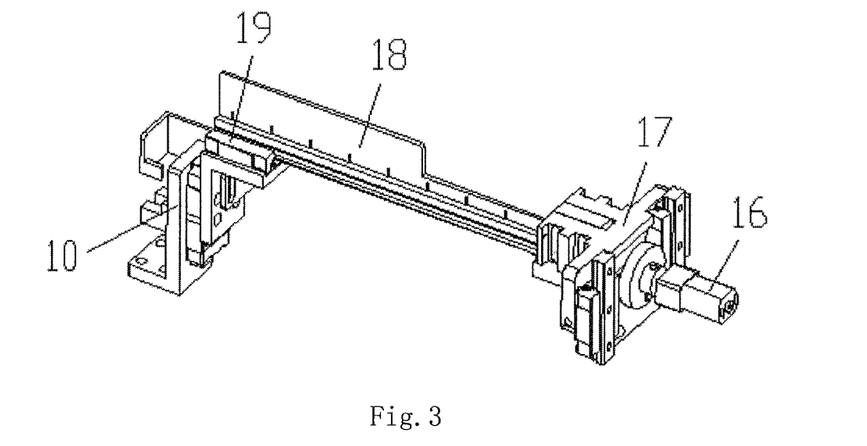
FIG. 3 shows a stereoscopic view of the push-up device.

Preferably, the push-up device may include lifting elevators 10 which are provided in front and at back of the supporting plate 1. The front lifting elevators 10 is connected to a push-up movable slide rails housing 19 and the back lifting elevators 10 fits a push-up lifting seat 17 through the slide rails, and a push-up movable cylinder 16 which is connected to a push-up block 18 is provided on the push-up lifting seat 17. The front end of push-up block 18 fits the push-up movable slide rails housing 19. The back lifting elevators 10 and the push-up movable cylinder 16 are connected to the controller.

Figure 4:
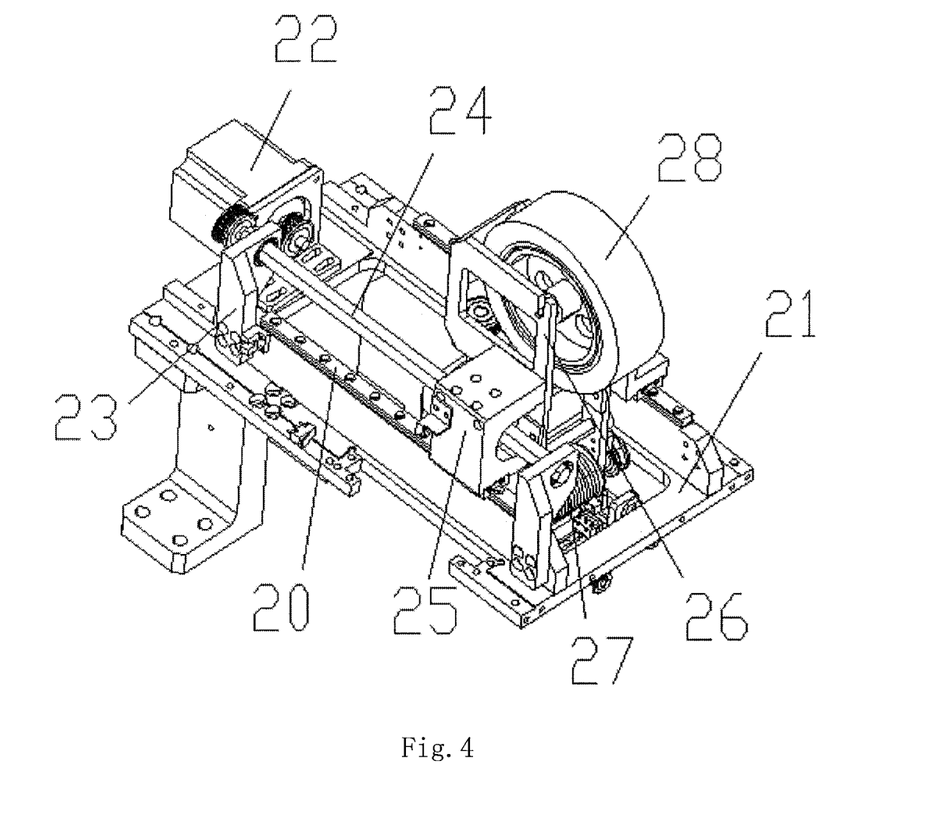
FIG. 4 shows a stereoscopic view of the bonding unit.

Preferably, the bonding unit 7 may include a bonding seat 21 provided on the supporting plate 1. And on the bonding seat 21, a bonding screw seat 23 is provided. Provided on the bonding screw seat 23, a front and rear bonding screw 24 is connected to a front and rear bonding movable motor 22 which is provided on the bonding seat 21 through a synchronous belt and a synchronous wheel. The front and rear bonding screw 24 is plugged into and engages with a front and rear bonding movable seat 25 where an adhesive tapes seat 26 is provided. On the adhesive tapes seat 26, a tapes roll 28 is provided and below the adhesive tapes seat 26, an adhesive device 27 fitting splice tapes is provided. The front and rear bonding movable motor 22 and the adhesive device 27 are connected to the controller.

Figure 5:
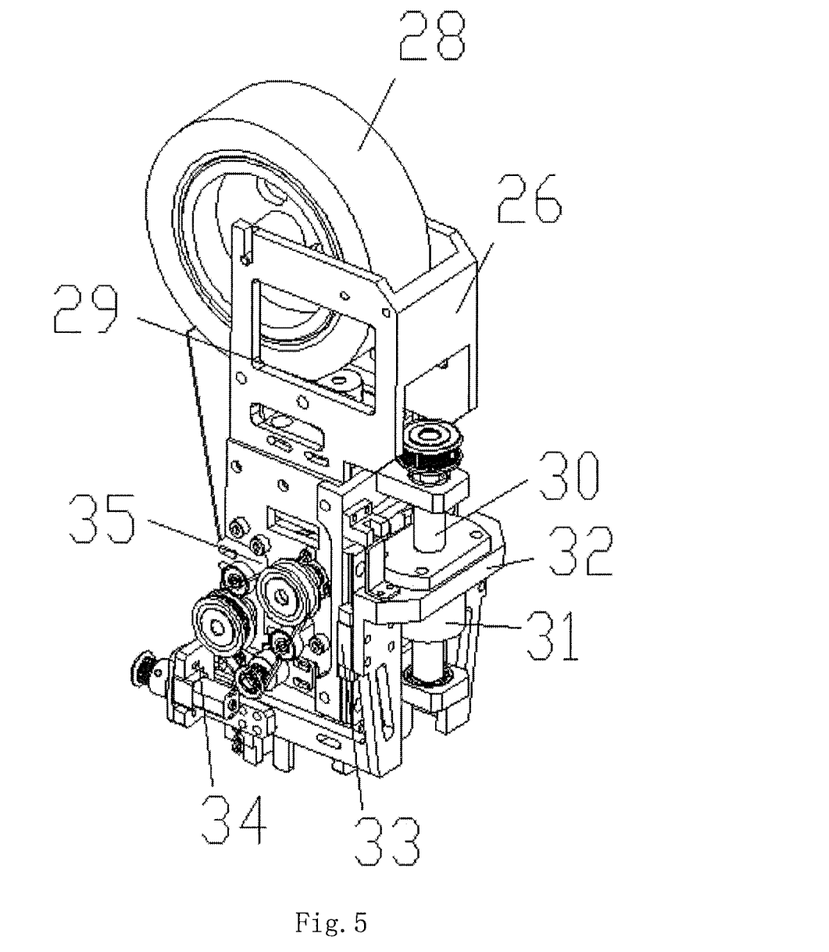
FIG. 5 shows a stereoscopic view of the adhesive device.
Figure 6:
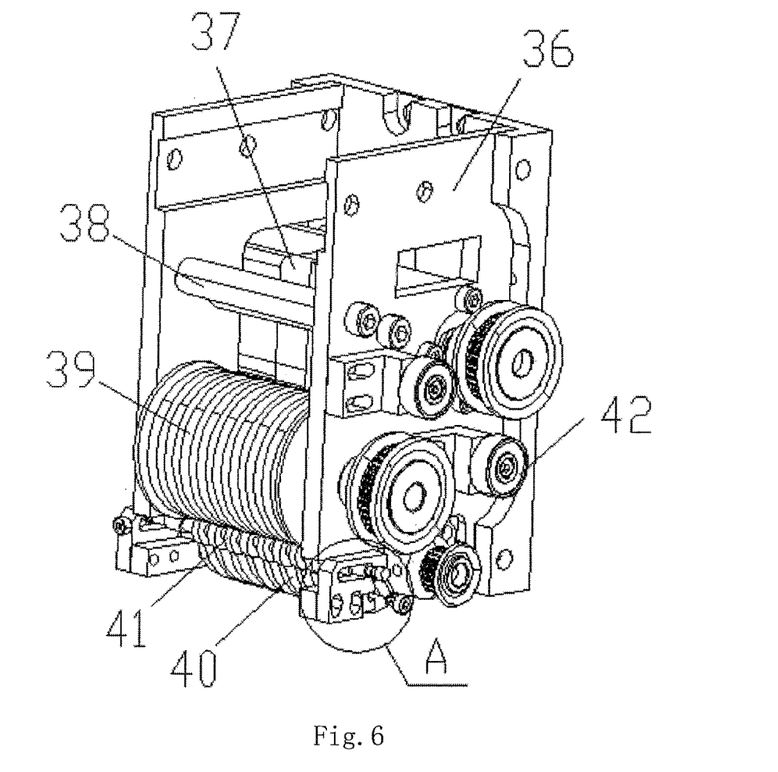
FIG. 6 shows a stereoscopic view of the adhesive feeding device.

Preferably, the adhesive device 27 may include an adhesive feeding device 35 which is provided below the adhesive tapes seat 26 and may include an adhesive pressing device 34 fitting the adhesive feeding device 35 and provided below it. The adhesive feeding device 35 may include an adhesive feeding seat 36 in which an adhesive feeding motor 37 and a guide cylinder 38 are installed. The guide cylinder 38 fits the tapes roll 28 and below it, the first guide cylinder 39 which fits the guide cylinder 38 and a compressing cylinder 41 which fits the first guide cylinder 39 are installed. The first guide cylinder 39 is connected to the adhesive feeding motor 37 through the synchronous belt and synchronous wheel. And the adhesive pressing device 34 and the adhesive feeding motor 37 are connected to the controller.

Figure 7:
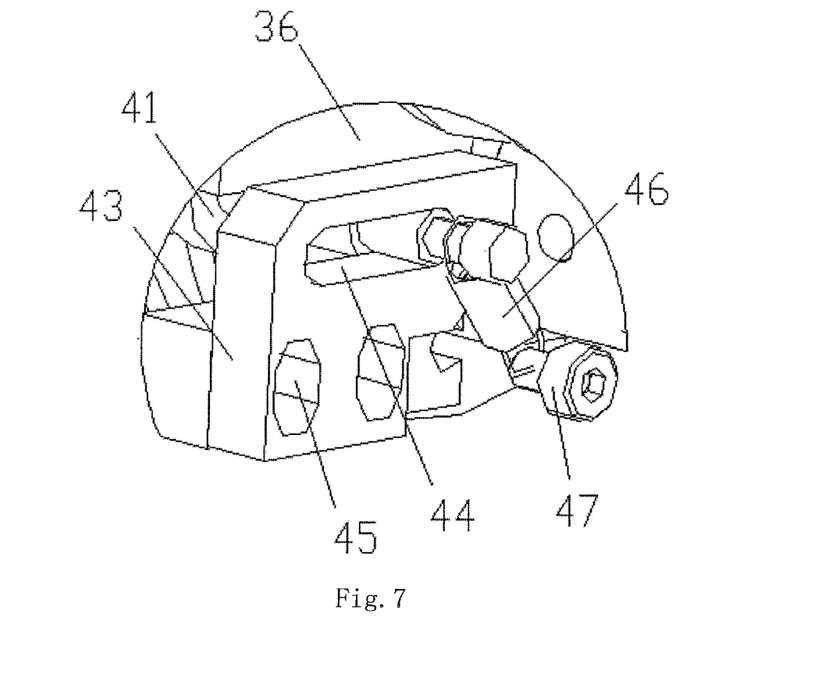
FIG. 7 is an enlarged view of A in FIG. 6.

Preferably, below the first guide cylinder 39, the second cylinder 40 which fits the compressing cylinder 41 is installed. The first the first guide cylinder and the second guide cylinder 40 are connected to the adhesive feeding motor 37 through the same synchronous wheel. On the side of the adhesive feeding seat 36, a tension wheel 42 fitting the synchronous belt is provided. The first guide cylinder 39 and the second guide cylinder 40 are formed by combining round blocks according to a certain distance, and the gaps are complementary.

Preferably, a compressing cylinder 41 is provided on the compressing seat 43 which is below the adhesive feeding seat 36. And on the compressing seat 43, an adjusting slot 44 is provided and fits the compressing seat 43. The end of the compressing cylinder 41 is connected to an adjusting bolt 47 through a stretched spring 46. The adjusting bolt 47 fits the adjusting holes 45 on the compressing seat 43 and not less than two adjusting holes 45 installed on the compressing seat 43.

Figure 8:
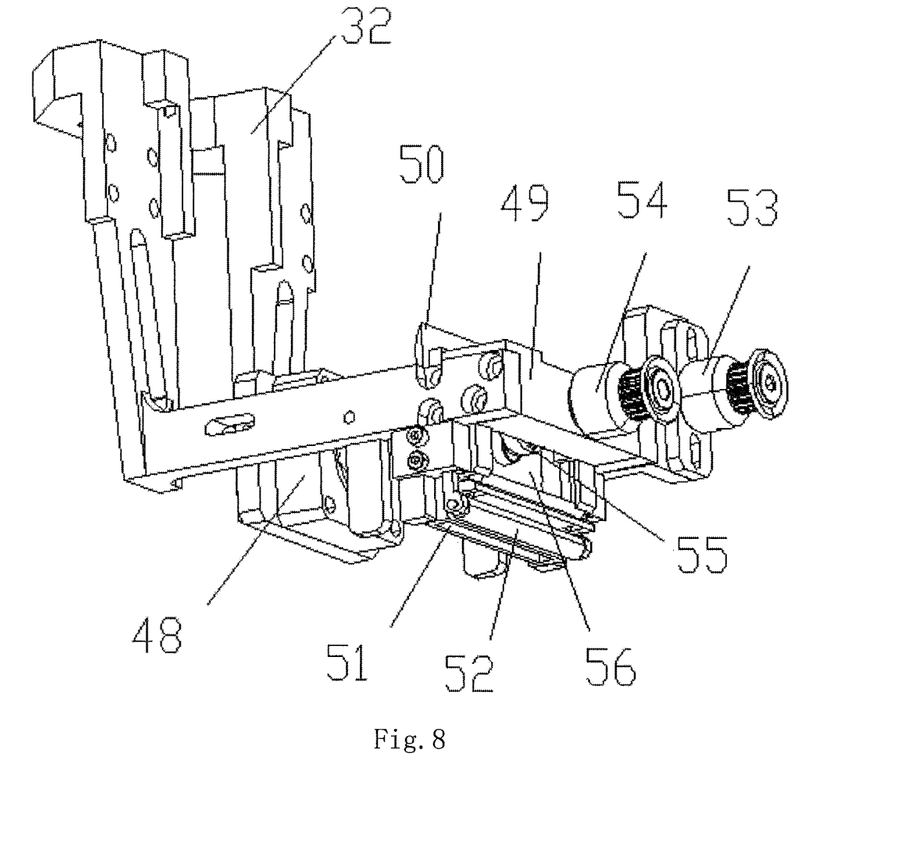
FIG. 8 shows a stereoscopic view of the adhesive pressing device.
Figure 9:
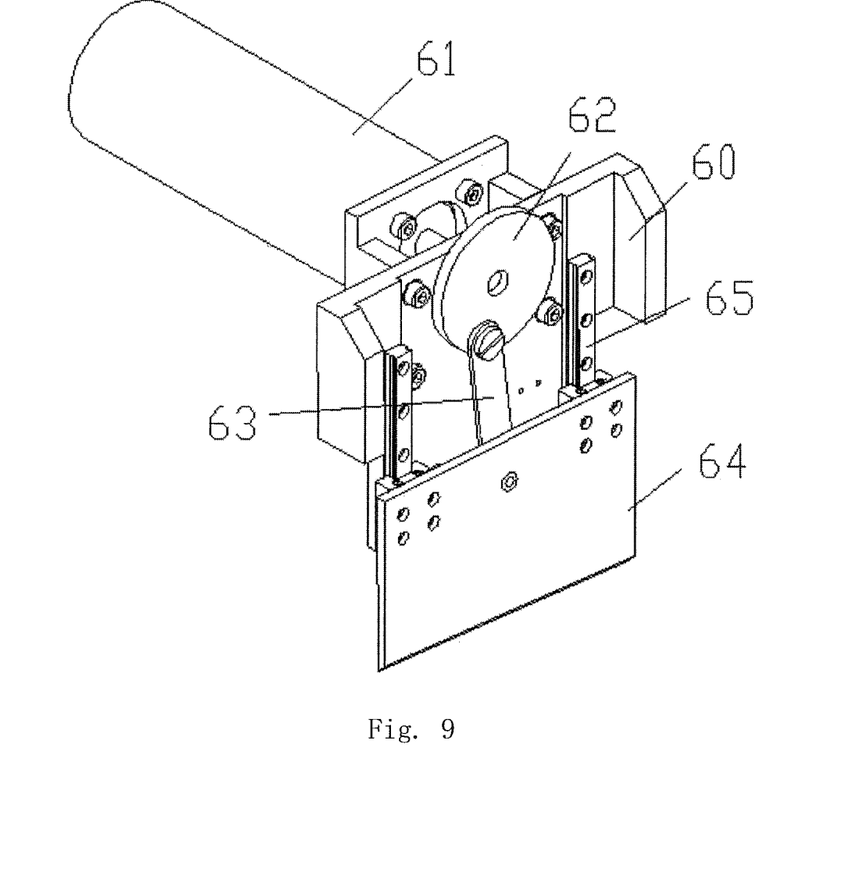
FIG. 9 shows a stereoscopic view of cut-off device.

Preferably, the adhesive pressing device 34 may include an adhesive pressing seat 49 provided below the adhesive feeding seat 36. At the back side of the adhesive pressing seat 49, an adhesive guiding block 50 fitting the tapes is provided. From the back to front, a compressing glue cylinder 52 and a glue cutting opening 51 are arranged in order. On the adhesive pressing seat 49, transport axis 53 fitting the adhesive pressing motor is provided and the transport axis 53 is connected to camshaft 54 through the synchronous belt and synchronous wheel. On the camshaft 54, a glue cut-off cam 55 is provided, which is connected to a glue cut-off blade 56 fitting the glue cutting opening 51. The adhesive pressing motor is connected to the controller.

Preferably, the adhesive pressing seat 49 is provided on the adhesive lifting seat 32 and the adhesive lifting seat 32 is located at the back of the adhesive pressing seat 49 where a radiator 48 is provided. The adhesive lifting seat 32 is fixed on and fits an adhesive lifting block 31 which is inserted on an adhesive lifting screw which is on an adhesive feeding seat 36. The adhesive lifting screw 30 is connected to an adhesive lifting engine 29 on the adhesive feeding seat 36 through the synchronous belt and synchronous wheel. The adhesive lifting seat 32 fits the adhesive lifting slider 33 provided on the adhesive feeding seat 36. The radiator 48 and the adhesive lifting engine 29 are connected to the controller.

In a preferred use, the user may assemble the device, with the adjusting conveying motor 11 driving the adjusting conveying belt 12 and further driving the conveying movable block 13, the adjusting conveying board 14 may drive the front conveying rack 2, and thereby the driving routine may be set as above mentioned. Then the user may put the new and the old splice tapes on the new splice tapes conveying device 3 and the old splice tapes conveying device 4 to convey them to the center part. If the damaged part of the connecting place of the old splice tapes conveying device, the front and rear bonding movable motor 22 may drive the front and rear bonding screw 24, then the cut-off motor 61 may drive the cut-off cam 62. With the up and down movement of the cut-off blade 64, the damaged part of the old splice tapes may be cut off. If the connecting part of the old splice tapes is not damaged, the front and rear bonding movable seat 25 may be moved forward, driving the adhesive device 27 to move forward. Then the user may control the adhesive feeding motor 37 and drive the first guide cylinder 39 and the second cylinder 40. Furthermore, the tapes on the tapes roll 28 may go through the guide cylinder 38 and may be transferred from where the first guide cylinder 39 fits the second cylinder 40. Then the adhesive guiding block 50 may go through the adhesive pressing device 34 to make the tapes fall vertically. Then the adhesive lifting engine 29 drives the adhesive lifting seat 32 by adhesive lifting screw 30 to the suitable place and make the adhesive pressing device 34 stay in the suitable place. Then the front and rear bonding movable motor 22 is moved backward by the front and rear bonding movable seat 25 driven by front and rear bonding screw 24 while driving the whole adhesive device 27 to move backward. Furthermore, compressing glue cylinder 52 may compress the bonding part of the new splice tapes conveying device and the old splice tapes conveying device from front to back to finish the bonding process of the new and old splice tapes conveying device. Then the adhesive pressing motor may be controlled to drive the transport axis 53, furthermore the glue cut-off cam 55 may be driven to rotate. Then the glue cut-off blade 56 may move up and down to cut off the tapes from the glue cutting opening 51.

It should be noted that the term "comprising" is used herein, "comprising" or any other variants thereof intended to encompass a non-exclusive inclusion, such that a process comprising a series of elements is included, the method, the article or the device not only comprise those elements but also include other elements not explicitly listed, or further comprises the inherent elements of the process, the method, the article or the equipment.

The principle and the implementation mode of the invention are set forth in the specification, the description of the above examples is only used for helping understand the method of the invention and the core idea of the method. The above descriptions are only preferred embodiments of the present invention, and it should be noted that, due to the limitation of character expression, an infinite specific structure exists objectively, for persons of ordinary skill in the art, without departing from the principle of the present invention, a plurality of improvements, modifications and changes can be made, and the technical features can also be combined in a proper manner; the conception and the technical scheme of the invention can be directly applied to other occasions without improving the conception and the technical scheme of the invention, can be regarded as the protection scope of the invention.

What is claimed is:

1. A bonding machine for new and old SMT splice tapes, comprising:
    a supporting plate (1);
    a new splice tape conveying device (3) and an old splice tape conveying device which (4) are disposed upon said supporting plate (1) so as to face each other;
    limit blocks which (9) are disposed upon both sides of said two conveying devices for fitting the splice tapes;
    a push-up device (8) which is disposed at a substantially central portion of said supporting plate (1) so as to fit the splice tapes;
    a bonding unit which (7) is disposed above said push-up device (8) so as to also fit the splice tapes;
    a cut-off device (6), including a cut-off seat which (60), is disposed upon said supporting plate (1) so as to be disposed above said old splice tape conveying device (4); and
    a cut-off motor (61), is connected to a cut-off cam (62), which is disposed upon said cut-off seat (60), and said cut-off cam (62) is connected to a cut-off blade (64) through a cut-off link (63);
    wherein said cut-off blade (64) fits a cut-off slide rail (65) which is provided upon said cut-off seat (60);
    said new splice tape conveying device (3) and said old splice tape conveying device (4) are both disposed upon a front conveying rack (2) which is connected to two adjusting conveying boards (14) which are centrosymmetric so as to extend forwardly and backwardly;
    wherein said two adjusting conveying boards (14) are disposed upon a conveying movable block (13) which fits an adjusting conveying slide rail (15) which extends forwardly and backwardly upon said supporting plate (1);
    wherein said conveying movable block (13) is fixed on and is engaged with an adjusting conveying belt (12) which fits an adjusting conveying motor (11) disposed upon said supporting plate (1); and
    said adjusting conveying motor (11), said push-up device (8), said bonding unit (7), and said cut-off motor (61) are connected to a controller.

2. A bonding machine for new and old SMT splice tapes as set forth in the claim 1, wherein:
    said push-up device (8) comprises front and rear lifting elevators (10) which are provided, respectively, in front of and in back of said supporting plate (1);
    said front lifting elevators (10) are connected to a push-up movable slide rails housing (19) while said rear lifting elevators (10) fit a push-up lifting seat (17) through slide rails of said push-up movable slide rails housing (19), and a push-up movable cylinder (16) is connected to a push-up block (18) which is disposed upon said push-up lifting seat (17);
    a front end portion of said push-up block (18) fits push-up movable slide rails housing (19); and
    said front and rear lifting elevators (10) and said push-up movable cylinder (16) are connected to said controller.

3. A bonding machine for new and old SMT splice tapes as set forth in claim 1, wherein:

said bonding unit (7) comprises a bonding seat (21) disposed upon said supporting plate (1);

a bonding screw seat (23) is disposed upon said bonding seat (21);

a bonding screw (24) is disposed upon said bonding screw seat (23) and is connected to a movable bonding motor (22) which is disposed upon said bonding seat (21) by means of a synchronous belt and a synchronous wheel;

said bonding screw (24) is, plugged into and engages a movable bonding seat (25) upon which an adhesive tape seat (26) is disposed;

a tape roll (28) is disposed upon said adhesive tape seat (26), and an adhesive device (27) for fitting said splice tapes is also disposed upon said adhesive tape seat (26); and said movable bonding motor (22) and said adhesive device (27) are connected to said controller.

4. A bonding machine for new and old SMT splice tapes as set forth in claim 3, wherein:

said adhesive device (27) comprises an adhesive feeding device (35) which is disposed beneath said adhesive tape seat (26) and comprises an adhesive pressing device (34) which fits said adhesive feeding device (35) and is disposed beneath said adhesive feeding device (35);

wherein said adhesive feeding device (35) comprises an adhesive feeding seat (36) within which an adhesive feeding motor (37) and a first guide cylinder (38) are disposed;

wherein said first guide cylinder (38) fits said tape roll (28) and is disposed beneath said tape roll (28);

a second guide cylinder (39) fits said first guide cylinder (38) and a compressing cylinder (41), and said first guide cylinder (38), said second guide cylinder (39), and said compressing cylinder (41) are all mounted upon said adhesive feeding seat (36);

said second guide cylinder (39) is connected to said adhesive feeding motor (37) through means of a synchronous belt and a synchronous wheel; and said adhesive pressing device (34) and said adhesive feeding motor (37) are connected to said controller.

5. A bonding machine for new and old SMT splice tapes as set forth in claim 4, wherein:

a third guide cylinder (40), which fits said compressing cylinder (41), is also mounted upon said adhesive feeding seat (36), and said second guide cylinder (39) and said third guide cylinder (40) are connected to said adhesive feeding motor (37) through the same synchronous wheel;

wherein a tensioning wheel 42, fitting said synchronous belt, is mounted upon a side of said adhesive feeding seat; and wherein said second guide cylinder (39) and said third guide cylinder (40) comprise cylindrical blocks spaced a predetermined distance away from each other.

6. A bonding machine for new and old SMT splice tapes as set forth in claim 4, wherein:

said compressing cylinder (41) is disposed upon a compressing seat (43) which is disposed beneath said adhesive feeding seat (36);

an adjusting slot (44) is defined within said compressing seat (43);

an end of said compressing cylinder (41) is connected to an adjusting bolt (47) through means of a stretched spring (46); and said adjusting bolt (47) is adapted to be disposed within any one of a plurality of adjusting holes (45) which are defined within said compressing seat (43).

7. A bonding machine for new and old SMT splice tapes as set forth in claim 4, wherein:

said adhesive pressing device (34), comprises an adhesive pressing seat (49) disposed beneath said adhesive feeding seat (36);

an adhesive guiding block (50) for fitting the tapes is disposed upon a back side of said adhesive pressing seat (49);

a compressing glue cylinder (52) is mounted upon said adhesive pressing seat (49) so as to extend from said back side of said adhesive pressing seat (49) to a front side thereof, and a glue cutting opening (51) is defined within a front portion of said compressing glue cylinder (52);

a transport axle (53) is mounted upon said adhesive pressing seat (49) so as to mount an adhesive pressing motor thereon which is adapted to be connected to a camshaft (54) through means of a synchronous belt and a synchronous wheel;

a glue cut-off cam (55) is mounted upon said camshaft (54) and is adapted to be connected to a glue cut-off blade (56) which is operatively connected to said glue cutting opening (51); and said adhesive pressing motor is connected to said controller.

8. A bonding machine for new and old SMT splice tapes as set forth in claim 7, wherein:

said adhesive pressing seat (49) is mounted upon an adhesive lifting seat (32);

said adhesive lifting seat (32) is located at the back of said adhesive pressing seat (49) where a radiator (48) is provided;

said adhesive lifting seat (32) is fixed upon and fits with an adhesive lifting block (31) which is inserted upon an adhesive lifting screw 30 which is disposed upon said adhesive feeding seat (36);

said adhesive lifting screw (30) is connected to an adhesive lifting engine (29) which is mounted upon said adhesive feeding seat (36) through means of a synchronous belt and a synchronous wheel;

said adhesive lifting seat (32) fits an adhesive lifting slider (33) which is also mounted upon said adhesive feeding seat (36); and said radiator (48) and said adhesive lifting engine (29) are connected to said controller.

\* \* \* \* \*